(12) United States Patent
Saruta et al.

(10) Patent No.: US 9,189,709 B2
(45) Date of Patent: Nov. 17, 2015

(54) INFORMATION PROCESSING APPARATUS AND INFORMATION PROCESSING METHOD

(71) Applicant: CANON KABUSHIKI KAISHA, Tokyo (JP)

(72) Inventors: Takayuki Saruta, Tokyo (JP); Katsuhiko Mori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 535 days.

(21) Appl. No.: 13/685,420

(22) Filed: Nov. 26, 2012

(65) Prior Publication Data
US 2013/0141570 A1 Jun. 6, 2013

(30) Foreign Application Priority Data
Dec. 1, 2011 (JP) ................................ 2011-264125

(51) Int. Cl.
*G06K 9/78* (2006.01)
*H04N 7/18* (2006.01)
(Continued)

(52) U.S. Cl.
CPC .............. *G06K 9/78* (2013.01); *G06K 9/00208* (2013.01); *G06K 9/6255* (2013.01)

(58) Field of Classification Search
CPC .... G06K 9/6255; G06K 9/78; G06K 9/00201
USPC .......... 348/135, 161, 143, 169, 116; 382/103, 382/219, 159, 106, 291; 901/47; 700/259
See application file for complete search history.

(56) References Cited

U.S. PATENT DOCUMENTS

| 6,009,199 A | 12/1999 | Ho |
| 7,039,233 B2 | 5/2006 | Mori et al. |
| 7,577,297 B2 | 8/2009 | Mori et al. |

(Continued)

FOREIGN PATENT DOCUMENTS

| JP | 3300092 B2 | 7/2002 |
| JP | 2007-245283 A | 9/2007 |

(Continued)

OTHER PUBLICATIONS

Herbert Bay, et al., "SURF: Speeded Up Robust Features", Computing Vision and Image Understanding, vol. 110 (3), Jun. 2008.

(Continued)

*Primary Examiner* — Jefferey Harold
*Assistant Examiner* — Jean W Desir
(74) *Attorney, Agent, or Firm* — Fitzpatrick, Cella, Harper & Scinto

(57) ABSTRACT

A probability at which a target object takes a target object state is acquired for each of target object states that the target object is allowed to take, and a distribution of the probabilities is acquired. A success rate is acquired, for each relative target object state being determined in advance for a position and orientation of an image capturing device, at which the target object is successfully identified from a captured image obtained by capturing the target object having the relative target object state, and a distribution of the success rates is acquired. A position and orientation that the device is to take is determined based on the distribution of the success rates acquired for each of a plurality of positions and orientations that the image capturing apparatus is allowed to take, and the distribution of the probabilities.

8 Claims, 12 Drawing Sheets

(51) Int. Cl.
*G06K 9/00* (2006.01)
*G06K 9/62* (2006.01)

(56) References Cited

U.S. PATENT DOCUMENTS

| | | |
|---|---|---|
| 7,881,524 B2 | 2/2011 | Matsugu et al. |
| 7,881,917 B2 | 2/2011 | Nagatsuka et al. |
| 7,912,253 B2 | 3/2011 | Suzuki et al. |
| 8,027,514 B2 | 9/2011 | Takaki et al. |
| 8,031,906 B2 * | 10/2011 | Fujimura et al. ............ 382/103 |
| 8,209,172 B2 | 6/2012 | Mitarai et al. |
| 8,331,655 B2 | 12/2012 | Sato et al. |
| 8,340,439 B2 | 12/2012 | Mitarai et al. |
| 2006/0115157 A1 | 6/2006 | Mori et al. |
| 2009/0089235 A1 | 4/2009 | Torii et al. |
| 2009/0157707 A1 | 6/2009 | Ito et al. |
| 2011/0091115 A1 | 4/2011 | Kato et al. |
| 2011/0158540 A1 | 6/2011 | Suzuki et al. |
| 2012/0033853 A1 | 2/2012 | Kaneda et al. |
| 2012/0045120 A1 | 2/2012 | Tate et al. |
| 2012/0047182 A1 | 2/2012 | Yoshii et al. |

FOREIGN PATENT DOCUMENTS

| | | |
|---|---|---|
| JP | 2008-257649 A | 10/2008 |
| JP | 4238256 B2 | 3/2009 |
| JP | 2010-186219 A | 8/2010 |

OTHER PUBLICATIONS

Engin Tola, et al., "A Fast Local Descriptor for Dense Matching", CVPR 2008.
Bastian Leibe, et al., "Robust Object Detection with Interleaved Categorization and Segmentation", IJCV Special Issue on Learning for Vision for Learning, Aug. 2007.
K. Mikolajczyk, et al., "A Performance Evaluation of Local Descriptors", PAMI, 27(10), 2005.

* cited by examiner

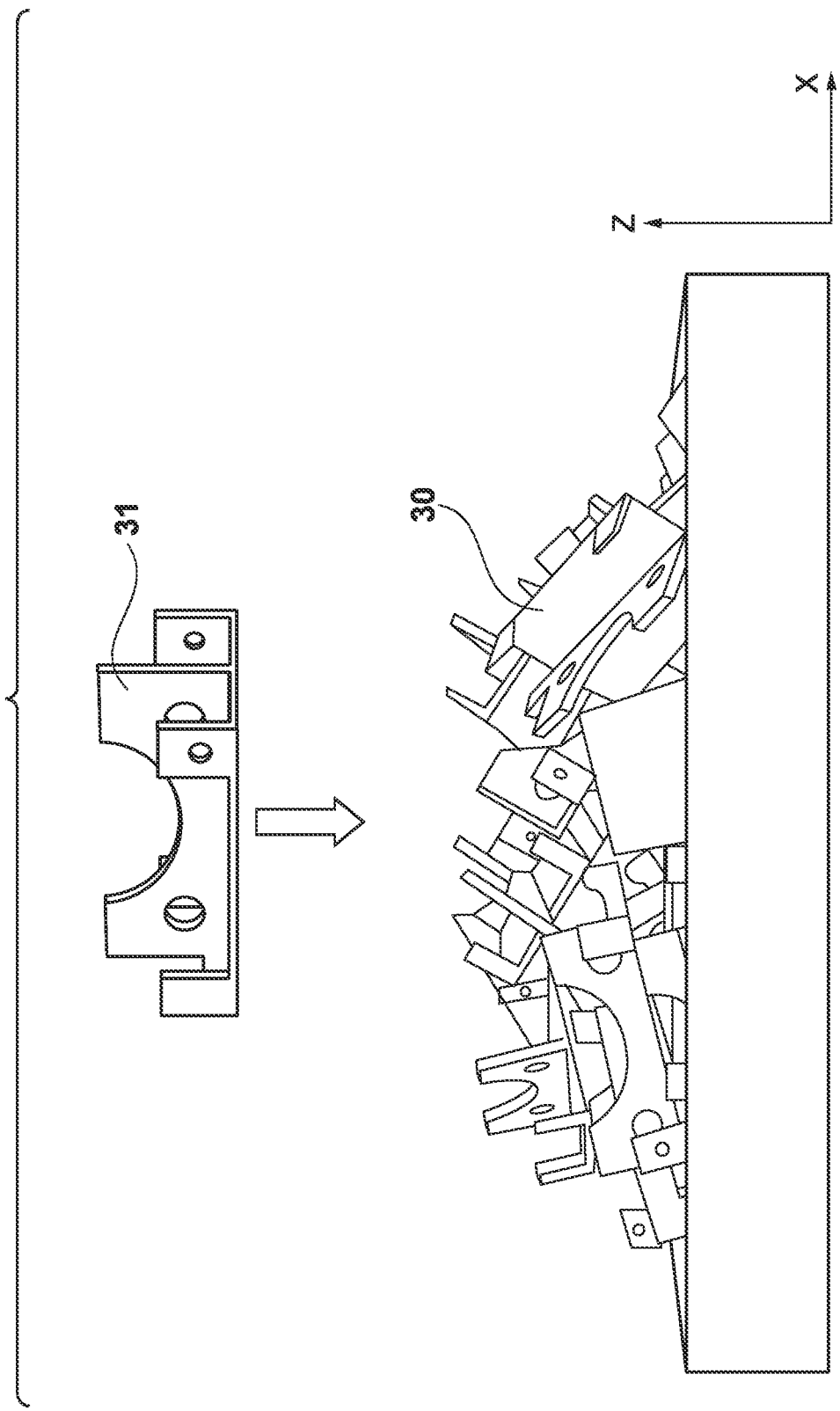

F I G. 15
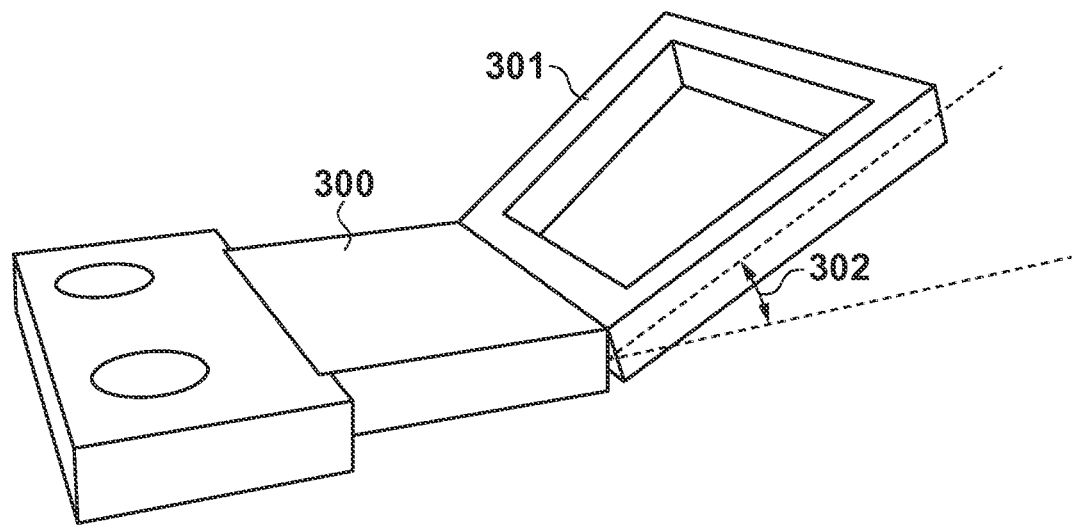
F I G. 16
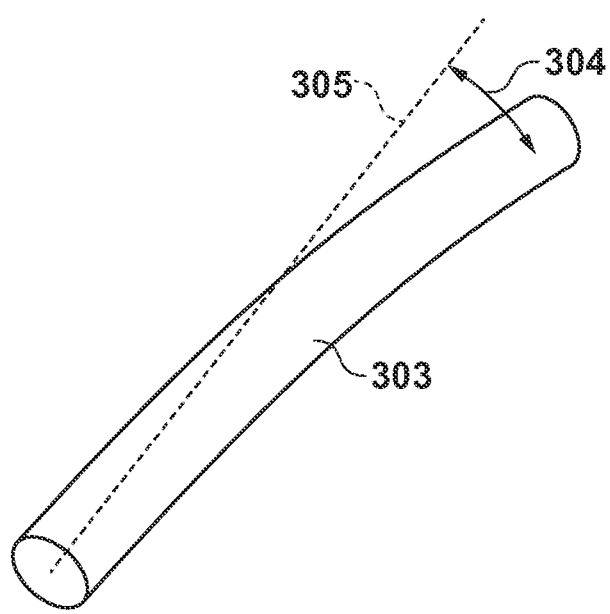

INFORMATION PROCESSING APPARATUS AND INFORMATION PROCESSING METHOD

BACKGROUND OF THE INVENTION

1. Field of the Invention

The present invention relates to a technique for identifying a target object at high accuracy.

2. Description of the Related Art

As one identification method, a study of controlling a computer to learn feature amounts extracted from an image of a target object obtained from an image capturing device, and identifying a type of an object which appears in the input image has been extensively made. Also, a study of simultaneously estimating a position and orientation of an object simultaneously with its type using model information or the like of the object has been made. As an application destination of that technique, position/orientation identification (recognition) of parts, which controls a robot to execute operations such as advanced assembling, is known.

Non-patent literature 1 (B. Leibe, "Robust Object Detection with Interleaved Categorization and Segmentation", IJCV Special Issue on Learning for Vision for learning, August 2007.) has proposed a method of estimating a central position of an object by probabilistic voting by associating features which are code-booked from learning images and detected features with each other (implicit-shape-model). With this method, not only a type but also a position of an object can be estimated.

In patent literature 1 (Japanese Patent Laid-Open No. 2008-257649), feature points are extracted from an input image to calculate their feature amounts, and feature points similar to feature amounts in learning images are set as corresponding points. Then, by voting to reference points based on feature amounts (including position information) of feature points of learning images for respective corresponding points in an input image, a target object is identified and a position is estimated.

Also, a technique for speeding up processing and enhancing its accuracy when information about states of target objects such as a pile of parts is acquired using a sensor such as a camera, positions and orientations of respective target objects are estimated from the acquired information such as an image, and target objects are sequentially picked up by gripping them by a robot has been studied.

Patent literature 2 (Japanese Patent No. 4238256) has proposed a method of generating a virtual pile, and simulating robot operations based on a virtual captured image of that pile. A pile state is assumed by randomly generating orientations of a plurality of target objects using model data such as CAD data of target objects, and operations for handling a target object by a robot are simulated.

In patent literature 3 (Japanese Patent No. 3300092), values which can be assumed by parameters that define a position and orientation of a target object, are stochastically predicted, a region (ROI) where features that define the target object exist on the screen is limited or that where the features exist on a parameter space is limited according to the prediction result.

Patent literature 4 (Japanese Patent Laid-Open No. 2007-245283) shortens a processing time by selecting an orientation of a work from those limited to a plurality of stable orientations upon estimation of the orientation of the work. Patent literature 5 (Japanese Patent Laid-Open No. 2010-186219) shortens a processing time by calculating degrees of stability for respective orientations of a work, and inhibiting use of templates which express orientations of low degrees of stability.

When positions and orientations of respective target objects such as a pile of parts are to be estimated, since the positions and orientations of the target objects have variations, feature amounts obtained from images obtained by viewing the target objects from various viewpoints have to be learned. However, it is often difficult to identify an image of the target objects obtained at a certain viewpoint, and it is difficult to raise identification accuracies of images of the target objects obtained at all the viewpoints.

The reason why identification accuracies of respective positions and respective orientations are different depending on target objects is that a feature portion helpful to identify a target object cannot always be obtained on an image when images of that target object are captured from all viewpoints. For this reason, when the positions and orientations of target objects such as a pile of parts in a factory or the like are to be estimated, it is required to determine the position and orientation of a camera so as to improve the identification accuracies.

In patent literature 2, CG models of target objects are virtually piled up so as to simulate teaching of robot operations. However, patent literature 2 does not include any description that improves the identification accuracies.

In patent literature 3, the position and orientation of a target object are stochastically predicted. However, patent literature 3 does not include any description that determines the position and orientation of a camera so as to improve the identification accuracy.

In patent literature 4, the orientation of a target object to be estimated is limited to those around stable orientations. However, patent literature 4 does not include any description which determines the position and orientation of a camera so as to improve the identification accuracy.

In patent literature 5, templates are generated using degrees of stability of orientations, but the degrees of stability are not used to obtain an accurate estimation result of an orientation. That is, patent literature 5 does not consider a reduction of estimation errors of an orientation using degrees of stability in estimation of the orientation.

SUMMARY OF THE INVENTION

The present invention has been made in consideration of the aforementioned problems, and provides a technique for determining the position and orientation of an image capturing device so as to enhance the identification accuracy of a target object in an image captured using the image capturing device.

According to the first aspect of the present invention, an information processing apparatus, comprises: a first acquisition unit configured to acquire a probability at which a target object takes a target object state for each of target object states that the target object is allowed to take, and configured to acquire a distribution of the acquired probabilities; a second acquisition unit configured to acquire a success rate, for each relative target object state being determined in advance for a position and an orientation of an image capturing device, at which the target object is successfully identified from a captured image obtained by capturing, by the image capturing device, the target object having the relative target object state, and configured to acquire a distribution of the acquired success rates; and a determination unit configured to determine a position and orientation that the image capturing device is to take based on the distribution of the success rates acquired by the second acquisition unit for each of a plurality of positions and orientations that the image capturing apparatus is allowed to take, and the distribution of the probabilities acquired by the first acquisition unit.

According to the second aspect of the present invention, an information processing method, comprises: a first acquisition step of acquiring a probability at which a target object takes a target object state for each of target object states that the target object is allowed to take, and of acquiring a distribution of the acquired probabilities; a second acquisition step of acquiring a success rate, for each relative target object state being determined in advance for a position and an orientation of an image capturing device, at which the target object is successfully identified from a captured image obtained by capturing, by the image capturing device, the target object having the relative target object state, and of acquiring a distribution of the acquired success rates; and a determination step of determining a position and orientation that the image capturing device is to take based on the distribution of the success rates acquired in the second acquisition step for each of a plurality of positions and orientations that the image capturing apparatus is allowed to take, and the distribution of the probabilities acquired in the first acquisition step.

Further features of the present invention will become apparent from the following description of exemplary embodiments with reference to the attached drawings.

BRIEF DESCRIPTION OF THE DRAWINGS

FIG. 7 is a view for explaining a generation method of a pile of target objects by simulation;

FIG. 15 is a view showing an example of a target object; and

FIG. 16 is a view showing an example of a target object.

DESCRIPTION OF THE EMBODIMENTS

Figure 1:
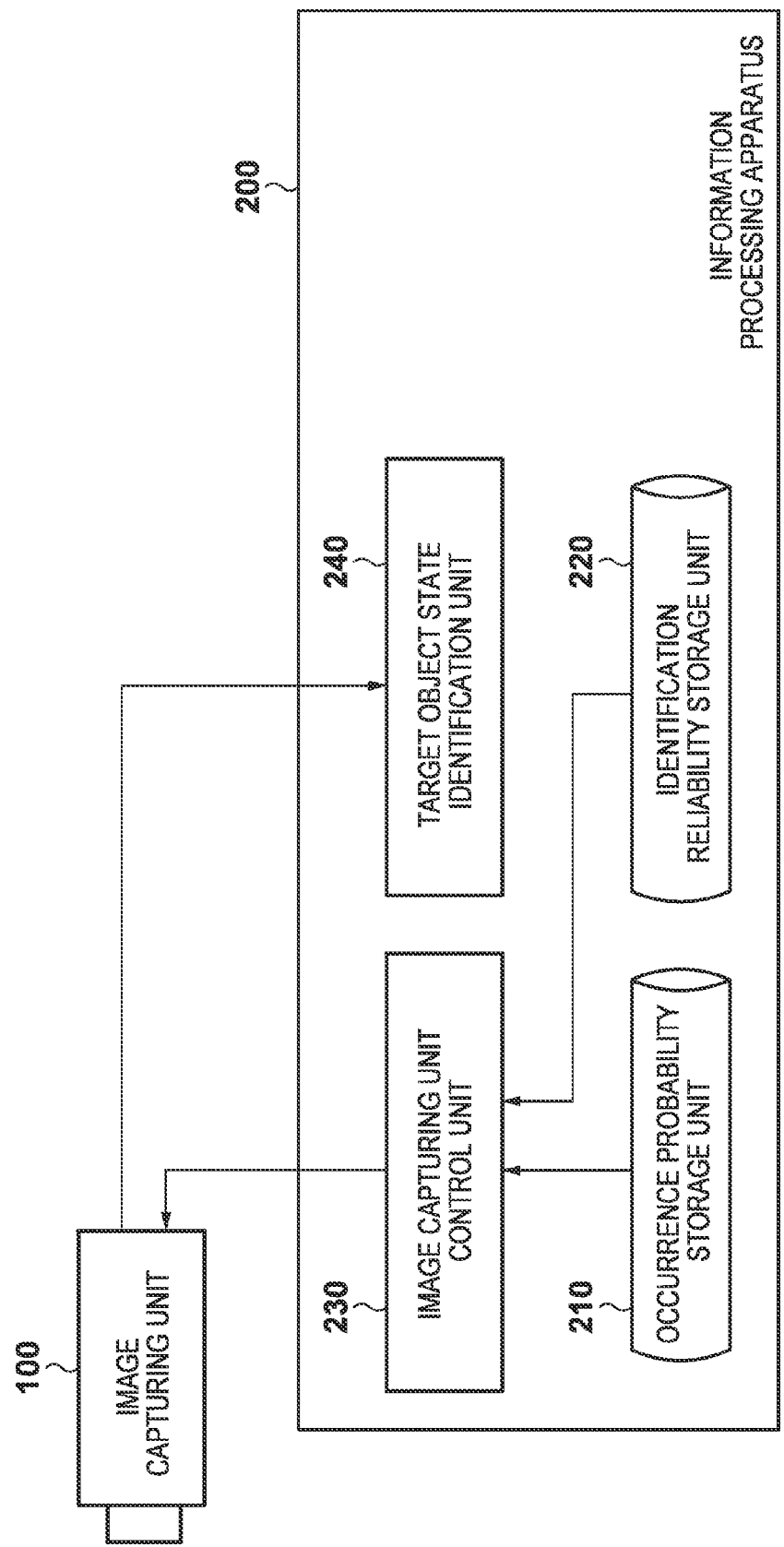
FIG. 1 is a block diagram showing an example of the functional arrangement of an information processing apparatus and its peripheral device.

Embodiments of the present invention will be described hereinafter with reference to the accompanying drawings. Note that an embodiment to be described hereinafter is an example when the present invention is practically carried out, and a practical embodiment of the arrangements described in the scope of claims.

First Embodiment

When positions and orientations of target objects such as a pile of parts in a factory or the like are to be estimated, a situation that models (three-dimensional virtual objects) of the target objects and the target objects are placed is often known in advance. In this case, by simulating the situation that pieces of model information of the target objects and the target objects are placed, a prior distribution of the positions and orientations of the target objects can be learned. Also, by defining the position and orientation of an image capturing device used to capture an image of the target objects, a virtual image of the target objects can be simulated, and the identification accuracies for respective positions and orientations of the target objects can be predicted.

An example of the functional arrangement of an information processing apparatus according to this embodiment and its peripheral device will be described below with reference to the block diagram shown in FIG. 1.

An image capturing unit 100 captures still images and moving images, and is used to capture images of target objects in this embodiment. The position and orientation of the image capturing unit 100 are controlled by an information processing apparatus 200, and images captured by the image capturing unit 100 are input to the information processing apparatus 200.

The information processing apparatus 200 includes an image capturing unit control unit 230, occurrence probability storage unit 210, target object state identification unit 240, and identification reliability storage unit 220. Functions of the respective units will be described below with reference to FIG. 2 which shows the flowchart of processing to be executed by the information processing apparatus 200. Note that information is stored in an appropriate memory in the information processing apparatus 200 unless otherwise defined.

In step S110, the image capturing unit control unit 230 acquires a distribution of probabilities at which when a target object state is defined by a position and/or an orientation of a target object, the target object takes the target object state with respect to target object states that the target object can take on a world coordinate system (first acquisition).

For example, this distribution may be stored in advance in the occurrence probability storage unit 210, and the image capturing unit control unit 230 may read it out. Alternatively, the image capturing unit control unit 230 may calculate a new distribution. In this embodiment, assume that the image capturing unit control unit 230 calculates a new distribution.

In step S120, the image capturing unit control unit 230 operates as follows. That is, the image capturing unit control unit 230 acquires a distribution of "success rates (identification success rates, identification reliabilities) at which a target object is successfully identified from a captured image obtained by capturing an image of the target object in a relative target object state, which is determined in advance for the position and orientation of the image capturing unit 100, by the image capturing unit 100" with respect to that target object state (second acquisition).

For example, this distribution may be stored in advance in the identification reliability storage unit 220, and the image capturing unit control unit 230 may read it out. Alternatively, the image capturing unit control unit 230 may calculate a new distribution. Alternatively, the distribution may be calculated by reflecting identification results in an online state. In this embodiment, assume that the image capturing unit control unit 230 calculates a new distribution.

In step S130, the image capturing unit control unit 230 determines one of a plurality of positions and orientations that the image capturing unit 100 can take as a desired position and orientation (to enhance the identification accuracy) using the distribution acquired in step S110 and that acquired in step S120. Then, the image capturing unit control unit 230 updates the position and orientation of the image capturing unit 100 to the determined position and orientation.

Note that in step S130, a relative position and orientation between a coordinate space (world coordinate system) on which probabilities of occurrence of a target object are defined and that (camera coordinate system) on which identification success rates are defined can be changed, so as to enhance the identification accuracy. For this purpose, when the position of the image capturing unit 100 is determined in advance, the position (layout condition) of the target object may be changed. For example, when all of target objects are placed on a tray or the like, the position and height of the tray may be changed to change the relative position to the image capturing unit 100.

In step S140, the target object state identification unit 240 acquires an image captured by the image capturing unit 100, the position and orientation of which have been changed, from the image capturing unit 100, and identifies target object states of target objects which appear in the acquired image. Note that an object to be identified is not limited to a specific target object.

Figure 3:
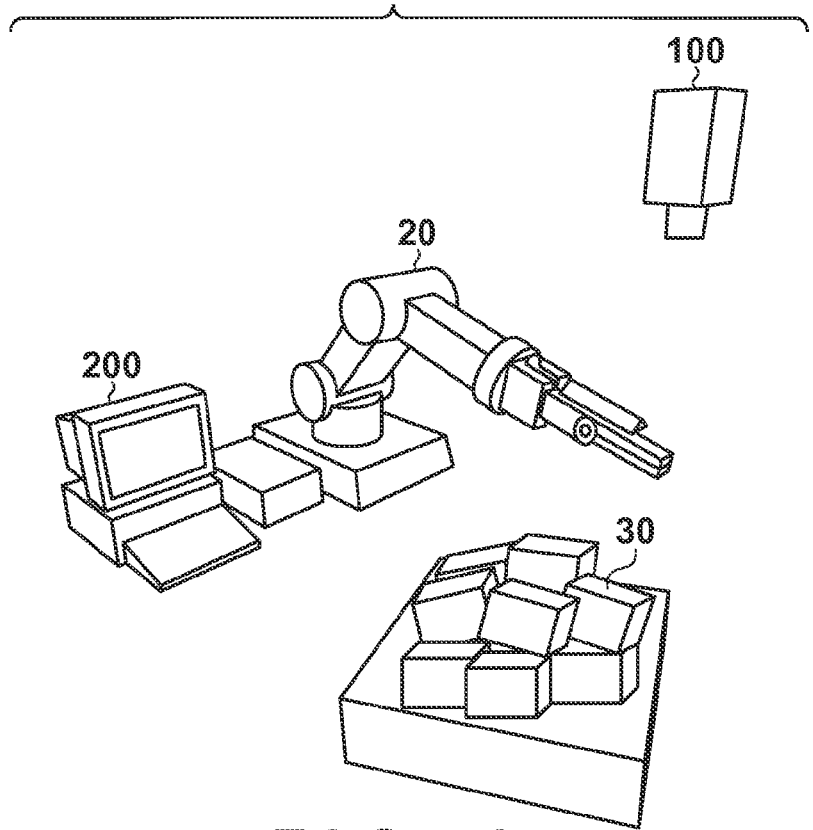
FIG. 3 is a view showing the outer appearance of a system including the information processing apparatus 200.

A practical arrangement example of a system including the information processing apparatus according to this embodiment will be described below with reference to the outer appearance view shown in FIG. 3. In FIG. 3, the same reference numerals denote the same components shown in FIG. 1, and a description thereof will not be repeated.

The image capturing unit 100 captures an image of a pile of target objects 30. A robot 20 is used to pick up a target object 30 from the pile of target objects 30. For example, by sending the position and orientation identified by the information processing apparatus 200 to this robot 20, this robot 20 controls an arm according to the position and orientation received from the information processing apparatus 200, and picks up this target object.

Details of the processes in respective steps shown in FIG. 2 will be described below. Details of the process in step S110 will be described first. In this case, an orientation is defined by 360°, and this embodiment handles representative orientations as those which are discretely sampled. In case of a joint object or deformed object, a joint angle or deformation angle can be handled as a variable which determines a target object state, but such variable will be explained later in the subsequent embodiments.

In case of a pile of target objects, the orientation distribution that target objects can take suffers a bias depending on positions and heights with respect to the pile. Hence, the position and orientation of the image capturing unit 100 are controlled to enhance the identification accuracy in consideration of that bias.

Representative orientations will be described below with reference to FIG. 4. In this embodiment, representative orientations are calculated using a geodesic dome. The geodesic dome uniformly and discretely expresses a spherical surface by recursively dividing a triangular surface element of a regular polyhedron into triangles of identical areas, and is a known method. If the center of the geodesic dome is considered as a target object 31, vertices 50 of the regular polyhedron obtained by the geodesic dome can be respectively considered as viewpoints which look down the target object 31 from various positions, and vertices and plane central points of each regular icosahedron can be used as the viewpoints.

In this embodiment, the number of vertices of the regular icosahedron is 16, the number of planes is 20, and orientations when the target object 31 is viewed from a total of 36 viewpoints are defined as representative orientations. Furthermore, for each representative orientation, an in-plane rotation when viewed from that direction has to be considered. For example, when the in-plane rotation is discriminated at granularities in increments of an angle=18°, 20 different in-plane rotation orientations exist. Therefore, in this case, there are 720 (=36×20) different representative orientations. FIGS. 5A to 5E respectively show states of the target object 31 at five different representative orientations of those defined in FIG. 4.

Each piled target object 31 is likely to direct in every directions with respect to the image capturing unit 100, and is likely to in-plane-rotated in these directions. For this reason, 720 different orientations are detected. Therefore, in this embodiment, the probability of occurrence corresponding to 720 different orientations is acquired. In this case, the probability of occurrence corresponding to 36 orientations may be acquired regardless of any in-plane rotation. In this case, detection is made by in-plane-rotating an image at the time of identification.

An example of a method of calculating the probability of occurrence for each target object state will be described below. Three-dimensional virtual object data (CAD data or the like) of a target object is stored in advance in a memory such as the occurrence probability storage unit 210, and the image capturing unit control unit 230 forms a three-dimensional virtual object using this data. Then, the image capturing unit control unit 230 randomly generates rotation angles for three axes of that model coordinate system, and selects a representative orientation closest to the generated rotation angles of the plurality of representative orientations. Furthermore, a count value for the selected representative orientation of the plurality of representative orientations is counted up. Thus, a selection count can be calculated for each of the plurality of representative orientations, and this selection count is divided by a generation count of rotation angles, thus calculating the probability of occurrence. Note that in a situation in which a target object is conveyed by a belt conveyor, since the target object has a stable orientation with respect to a floor or the like, rotation angles are generated to achieve the stable orientation. In this manner, depending on the situations, in place of quite randomly generating rotation angles, rotation angles are generated randomly within a certain range or based on given rules. Also, all of positions may be "0", or positions may be quite randomly generated, or may be generated randomly within a certain range or based on given rules.

Figures 6A, 6B:
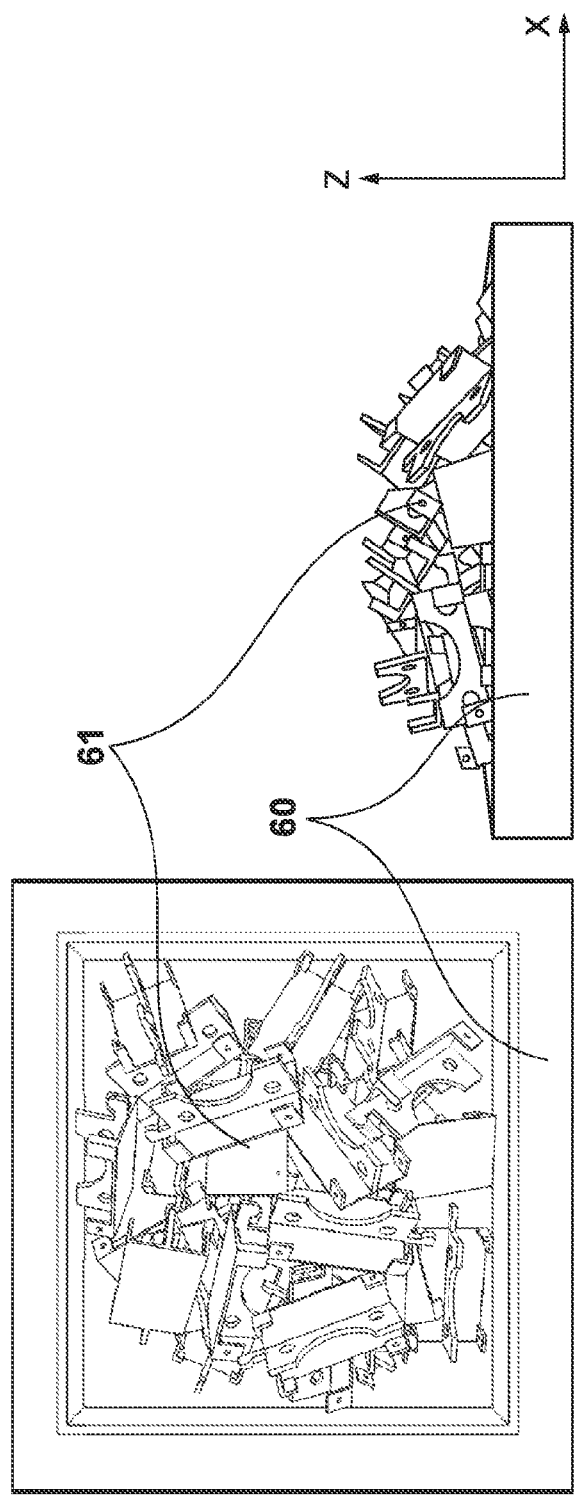
FIGS. 6A and 6B are views for explaining target objects on a tray 60.

Also, since this embodiment considers a situation in which target objects are piled, the method of calculating the probability of occurrence when target objects are piled on a work area (tray) 60, as shown in FIGS. 6A and 6B, will be described below. At this time, a Z direction of the world coordinate system is set to agree with a height direction of a piled target object set 61.

FIG. 6A shows a state when the target object set 61 is viewed from the above (Z direction), and FIG. 6B shows a state when the target object set 61 is viewed sideways (Y direction). The piled target object set 61 is generated by simulation using three-dimensional virtual objects of target objects, and representative orientations corresponding to orientations of respective target objects are stored, thereby storing the probability of occurrence of orientations of the piled target objects. A practical method is disclosed in patent literature 2 described in the description of the related art.

In a generation method of piled target objects by simulation, as shown in FIG. 7, rotation angles with respect to three axes of the model coordinate system are randomly generated to define an orientation, and a target object is moved downward from a random position within the work area (tray), thereby virtually piling target objects. More specifically, X and Y values on the world coordinate system are randomly determined from a domain which defines the work area, and a sufficiently large value is set as a Z value. A predetermined number of target objects 31, which are defined in advance, are moved down to generate virtually piled target objects 30. In this case, target objects are moved down in turn so as to stabilize respective target objects. A plurality of virtual piles are generated, and an orientation distribution $P_P(X, Y, Z, \theta x, \theta y, \theta z)$ on the world coordinate system is stored in the occurrence probability storage unit 210. This distribution $P_P(X, Y, Z, \theta x, \theta y, \theta z)$ is a distribution of probabilities at which a target object takes an orientation ($\theta x, \theta y, \theta z$) at an arbitrary position (X, Y, Z). $\theta x$, $\theta y$, and $\theta z$ are respectively rotation angles for the X-axis, Y-axis, and Z-axis on the world coordinate system. Definition of an orientation may use a single rotation expression expressed by a rotation axis and a rotation angle associated with that rotation axis or other expressions.

In this way, the method of acquiring the probability of occurrence with respect to respective target object states, the target object state expression method, and the like are not limited to specific methods (expression methods), and various methods can be used. That is, arbitrary methods can be used as long as a distribution of probabilities at which a target object takes a target object state with respect to target object states that the target object can take.

Note that when such distribution is stored in advance in the occurrence probability storage unit 210, the aforementioned processing is executed in advance, and the distribution obtained by this processing is stored in the occurrence probability storage unit 210.

Details of the process in step S120 will be described below. The process in step S120 is roughly classified into two steps, that is, an image generation step and reliability calculation step. The image generation step will be described first.

In this embodiment, the distribution of success rates with respect to the relative target object state, which is determined in advance for the position and orientation of the image capturing unit 100, is calculated. That is, the distribution of probabilities is calculated from the probabilities of respective target object states on the world coordinate system, while the distribution of success rates is calculated from success rates with respect to respective target object states on the camera coordinate system with reference to the position and orientation of the image capturing unit 100. Alternatively, these distributions may be defined on the image coordinate system.

Figure 8:
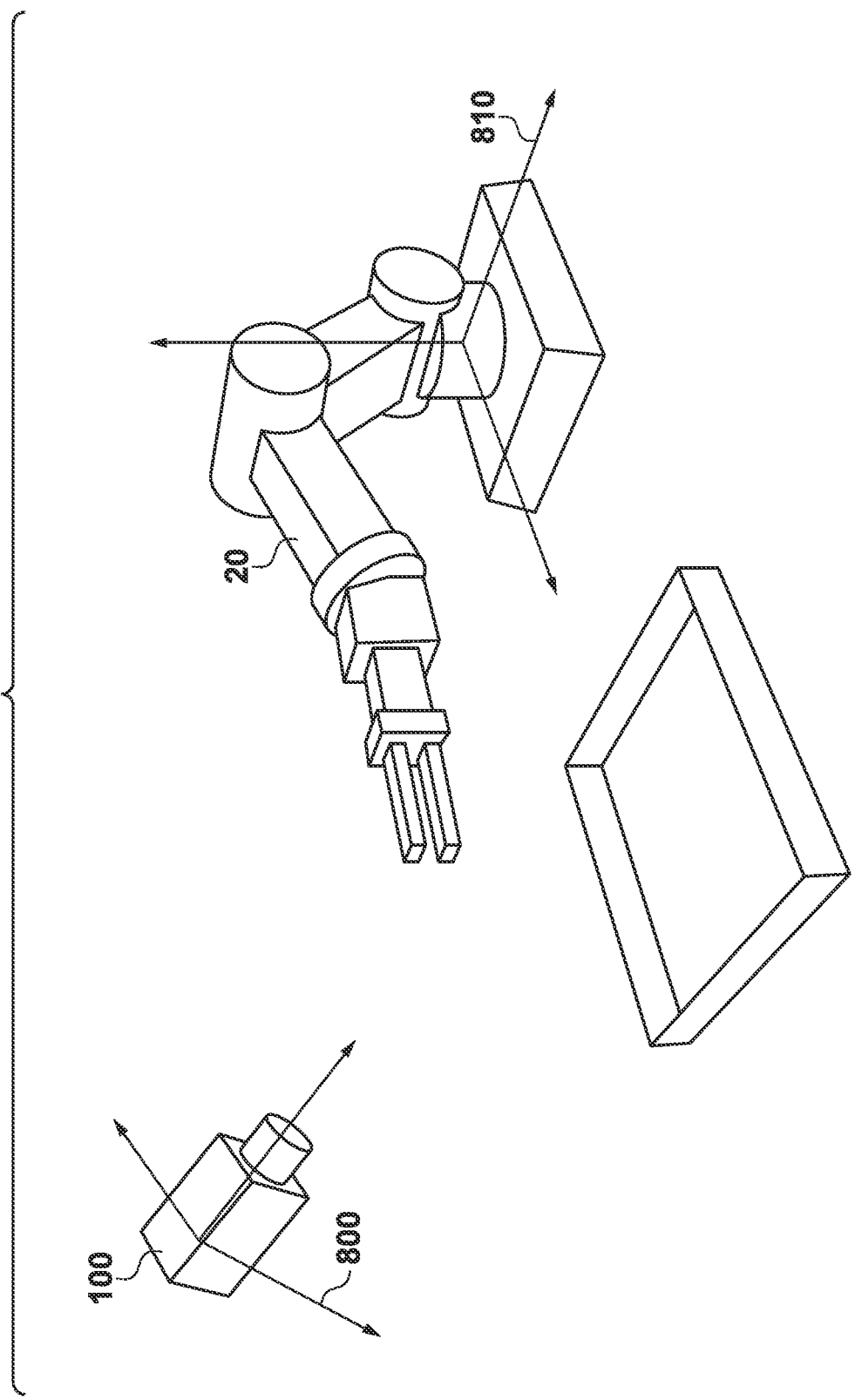
FIG. 8 is a view for explaining the relationship between a world coordinate system and camera coordinate system.

The relationship between the world coordinate system and camera coordinate system will be described below with reference to FIG. 8. The world coordinate system has one point on a real space as an origin, and defines three axes which are orthogonal to each other at this origin respectively as X-, Y-, and Z-axes. A world coordinate system 810 shown in FIG. 8 has a base of an arm of the robot 20 as an origin. On the other hand, the camera coordinate system has one point on the image capturing unit 100 as an origin, and defines three axes, which are orthogonal to each other at this origin respectively as X-, Y-, and Z-axes. A camera coordinate system 800 shown in FIG. 8 has an optical center of the image capturing unit 100 as an origin.

Note that the following description will be given under the assumption that the position and orientation of the tray as a target object on the world coordinate system, and the position and orientation of the camera coordinate system on the world coordinate system are given (have been calibrated).

Let $P_R(XC, YC, ZC, \theta cx, \theta cy, \theta cz)$ be a distribution of success rates defined on the camera coordinate system 800, and $P_R(x, y, \theta cx, \theta cy, \theta cz)$ be a distribution of success rates defined on the image coordinate system. An orientation indicates rotation angles with respect to the X-, Y-, and Z-axes of the camera coordinate system, as described above.

A layout range of target objects on the camera coordinate system or image coordinate system are determined by its layout environment. For example, in case of a task for picking up a piled target part using a robot in a cell or the like, a position where the image capturing unit 100 or that where target parts are placed is limited, thus determining the layout range of target objects.

In the image generation step, images of 36 orientations defined by the determined positions on the camera coordinate system and the above geodesic dome-like viewpoints or 720 orientations in consideration of in-plane rotations are generated. For example, when a position range on the camera coordinate system is limited to a range of 50 cm×50 cm×50 cm, and identification success rates are discretely defined at 5-cm intervals, XC=0, 5, ..., 50, YC=0, 5, ..., 50, and ZC=0, 5, ..., 50 are defined. Therefore, identification success rates can be calculated at 720000 points (=10×10×10° 720), and 720000 images are generated. When the number of images is large, images can be randomly sampled within the position range and orientation range. Alternatively, a target object may be actually placed on the work area (tray) and several images of it may be captured by the image capturing unit 100. In this case, a position and orientation of the captured target object on the camera coordinate system have to be separately input. A captured image of the target object is registered as that of a representative orientation closest to the input orientation. A registration destination is not limited to a specific registration destination, and may be an appropriate memory in the information processing apparatus 200.

The reliability calculation step will be described below. In the reliability calculation step, identification success rates for images registered in the above image generation step are calculated. The identification success rates are calculated using an identifier which has been learned in advance. When an identifier is that which calculates scores associated with respective states, scores of corresponding states are evaluated. As the identification success rates, similarities between registered images can be calculated, and lower identification success rates can be set for images with larger similarities without executing actual identification processing.

Various identifiers are available. This embodiment will explain a method of estimating a final identification result by integration processing of voting of identification results of weak identifiers. Various weak identifiers are available. This embodiment will exemplify a feature point-based method and that using a classification tree.

A learning method for identification processing by feature point-based voting will be described first. An image of a target object (learning image) is captured in advance, and features are extracted from this learning image. As examples of features to be extracted, a feature point and a feature amount which describes a feature around the feature point are extracted. For example, a feature amount which describes information of a luminance gradient around a feature point like SURF (H. Bay, "Speeded-Up Robust Features (SURF)", Computing Vision and Image Understanding, Vol. 110 (3)

June 2008, pp. 346-359.) may be used. In addition, feature points such as so-called Keypoints (E. Tola, "A Fast Local Descriptor for Dense Matching", CVPR 2008., K. Mikolajczyk, "A Performance Evaluation of Local Descriptors", PAMI, 27(10) 2004, pp. 1615-1630.) may be used. Also, an image patch, edgelet, and the like may be used.

In this case, let x and y be image coordinates, fi=(xi, yi) (i=1, 2, ..., N) be each feature point, and Fi (i=1, 2, ..., N) be a feature amount vector which expresses a feature amount. N is the total number of feature points obtained from the learning image, and i is an index for each feature point.

Figure 4:
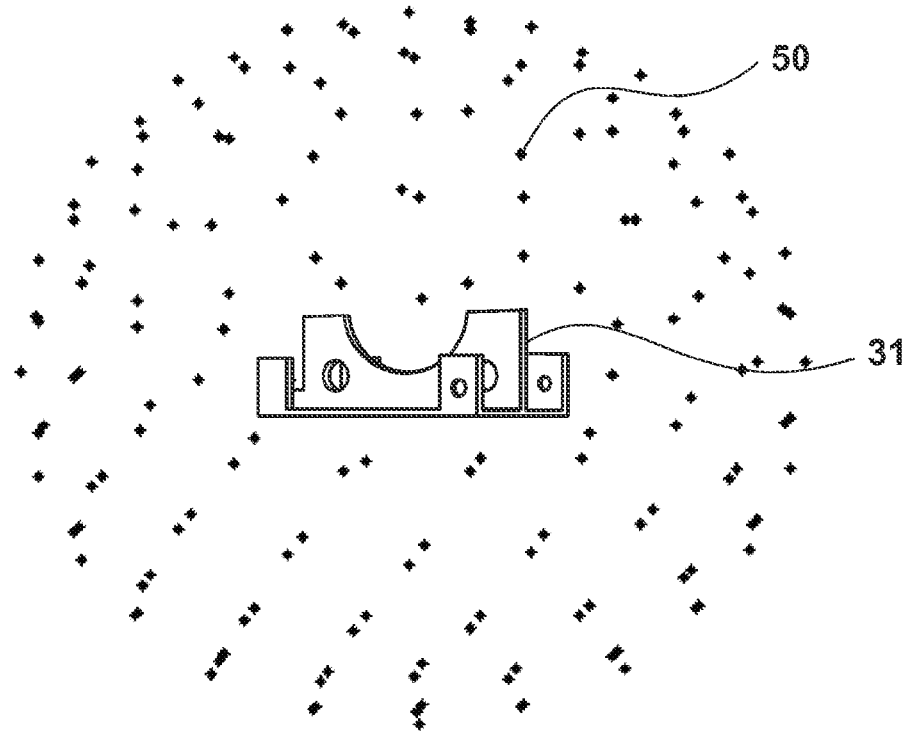
FIG. 4 is a view for explaining representative orientations.
Figure 5C:
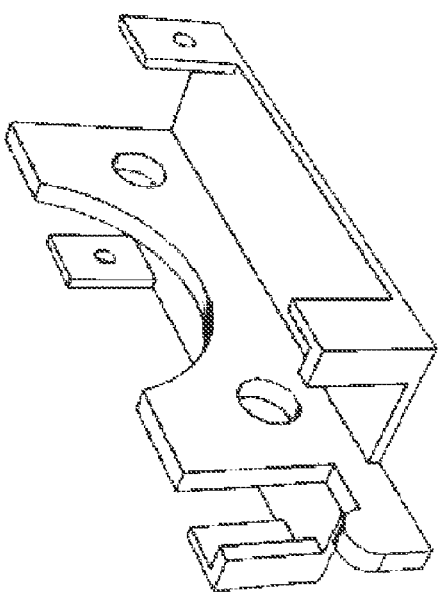
FIGS. 5A to 5E are views showing states of a target object 31 at five different representative orientations.
Figure 5B:
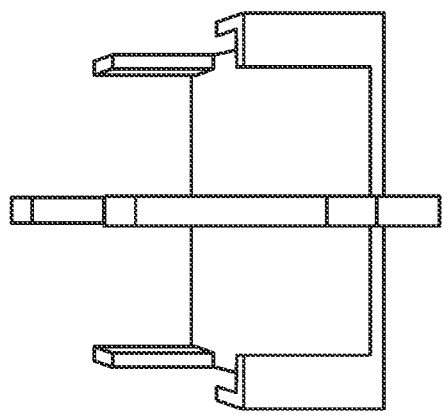
Figure 5A:
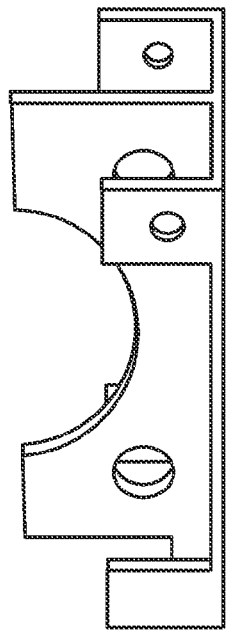
Figure 5E:
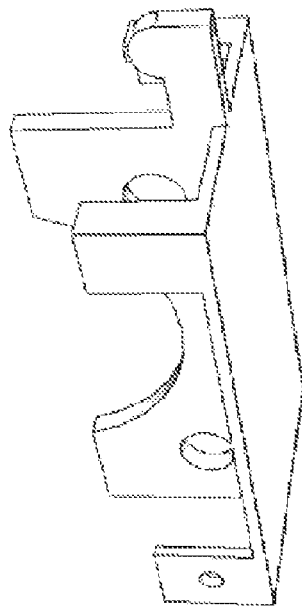
Figure 5D:
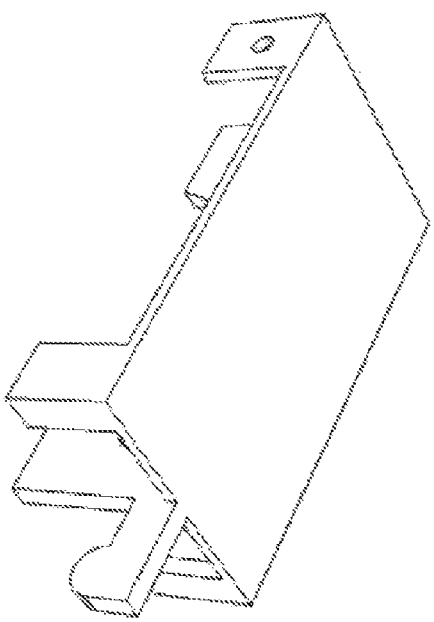

As the learning image, images captured from respective viewpoints (viewpoints 50) of the geodesic dome which surrounds the target object 31, as shown in FIG. 4 above, are used. Examples of the learning images are as shown in FIGS. 5A to 5E above. Feature points are acquired from the acquired learning images, and feature amounts which describe amounts around the feature points are acquired.

Next, learning of the identifier is made. In this case, a learning method and identification method when vectors to reference points of a target object corresponding to feature points of a learning image are stored, and a class and position of the target object are detected by voting to the reference points set on the target object in association with the feature amounts as in patent literature 1 will be described. In this case, a voting space is not particularly limited. For example, a space defined by the x- and y-axes of the image coordinate system and ID axis (class index representing a registered target object), a space defined by the x- and y-axes of the image coordinate system and a scale s axis, a space defined by camera coordinate axes XC, YC, and ZC, and the like may be used.

In place of voting to the reference points, identification can also be attained by a method of making probabilistic voting from respective local features to the target object center like the implicit-shape-model (non-patent literature 1) described in the description of the related art.

In case of a multi-class problem, after voting is respectively made to all classes, a class and position corresponding to the largest number of votes may be output as identification results or all detection points corresponding to numbers of votes equal to or larger than a pre-set threshold may be output as identification results.

Figure 9:
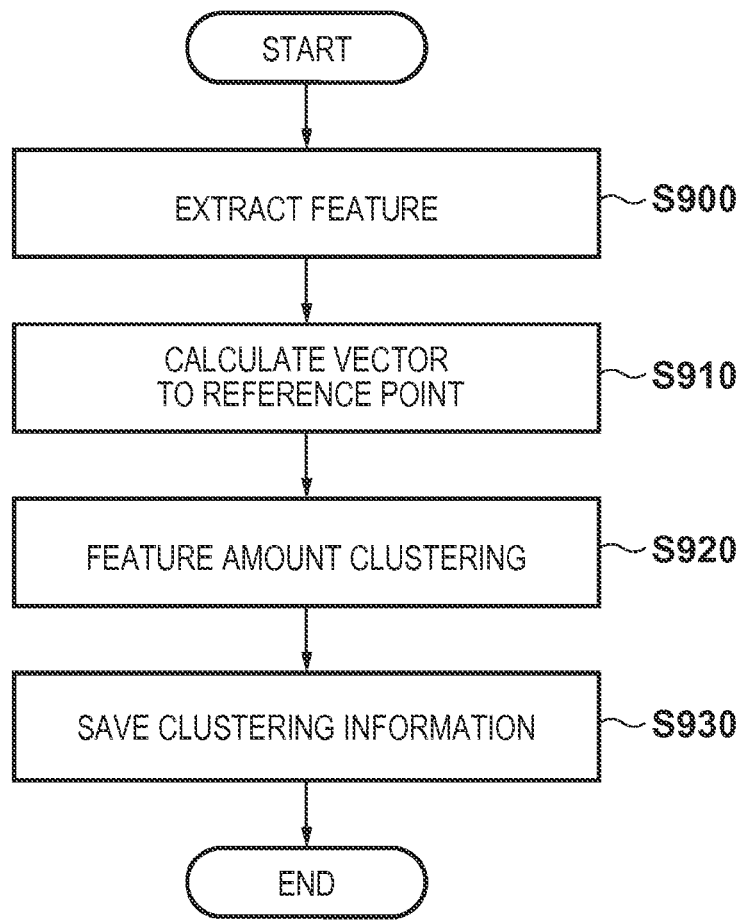
FIG. 9 is a flowchart of processing at the time of learning.

This embodiment will exemplify a case in which feature points are extracted from an image, and voting is made to reference points set on a target object, thereby estimating a type and position of the target object. The practical processing at the time of learning will be described below with reference to FIG. 9 which shows the flowchart of that processing.

In step S900, feature amounts Fi (i=1, 2, ..., N) of respective feature points fi of a learning image, and a class (an orientation or type of a target object; indicating one representative orientation in this embodiment) of that target object are saved. In this case, let IDi (i=1, 2, ..., N) be an index indicating a class of a target object. IDi assumes values ranging from 1 to P (P is the total number of classes).

Figure 10:
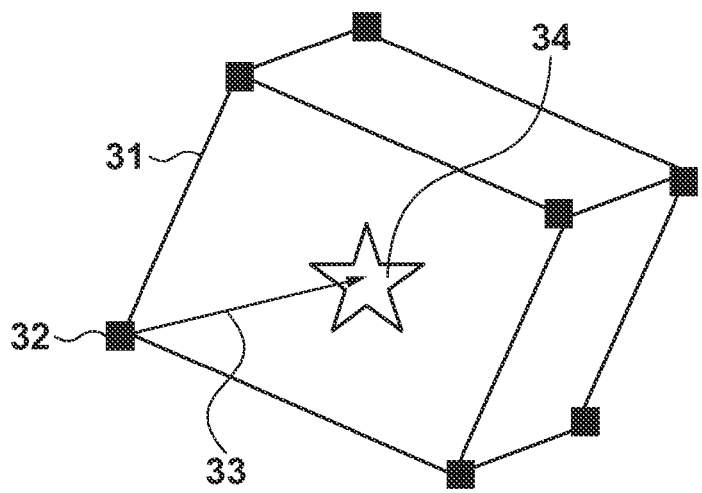
FIG. 10 is a flowchart of processing in step S910.

In step S910, vectors Mij (i=1, 2, ..., N, j=1, 2, ...) from respective feature points fi of the learning image to reference points Oj (j=1, 2 ...) on a target object are calculated. The process in step S910 will be described below with reference to FIG. 10.

Initially, a vector 33 Mn=(xo−xn, yo−yn) from a feature point 32 fn=(xn, yn) of the target object 31 to a reference point 34 (an object center in this case) O=(xo, yo) set on the target object is calculated.

After the processes of steps S900 and S910 are executed for all learning images, all obtained feature points fi (i=1, 2, ..., Nall) are clustered according to feature amounts Fi (i=1, 2, ..., Nall) in step S920.

In this case, Nall indicates the number of feature points obtained from all the learning images. As the clustering method, arbitrary clustering methods such as k-means, a self-organizing map algorithm, and the like can be used. For example, when k-means is used, the feature points can be clustered by defining the number K of clusters and using Euclidean distances between feature amounts Fi.

Finally, in step S930, representative vectors Fk' (k=1, 2, ..., K) of respective clusters (K is the number of clusters, and k is an index of a cluster) and feature points included the clusters are saved, and are used in association with feature amounts obtained in the identification processing.

Learning of the identifier may use a random forest method (Tin Kam Ho, U.S. Pat. No. 6,009,199) as one of ensemble learning methods. The random forest method executes pattern identification using a plurality of decision trees. In the random forest method, respective nodes randomly issue information inquiries, and learning patterns are divided in turn in accordance with inquiry results, thus branching a decision tree. A learning pattern which is left when a leaf node is reached is stored as a classification result of that leaf node. In this embodiment, classification is made to have respective feature points of respective learning images as learning patterns. As in the above learning, vectors Mij (i=1, 2, ..., N, j=1, 2, ...) from respective feature points fi to reference points Oj (j=1, 2 ...) on a target object, their feature amounts Fi (i=1, 2, ..., N), and a class (an orientation or type of a target object) of that target object are saved.

At the time of discrimination, the same inquiries as those at the time of learning are issued to trace from a root node to a leaf node. When a leaf node is reached, the stored pattern is output as a discrimination result of that decision tree. Discrimination results of all decision trees are integrated by voting or the like to output a final discrimination result.

Figure 11:
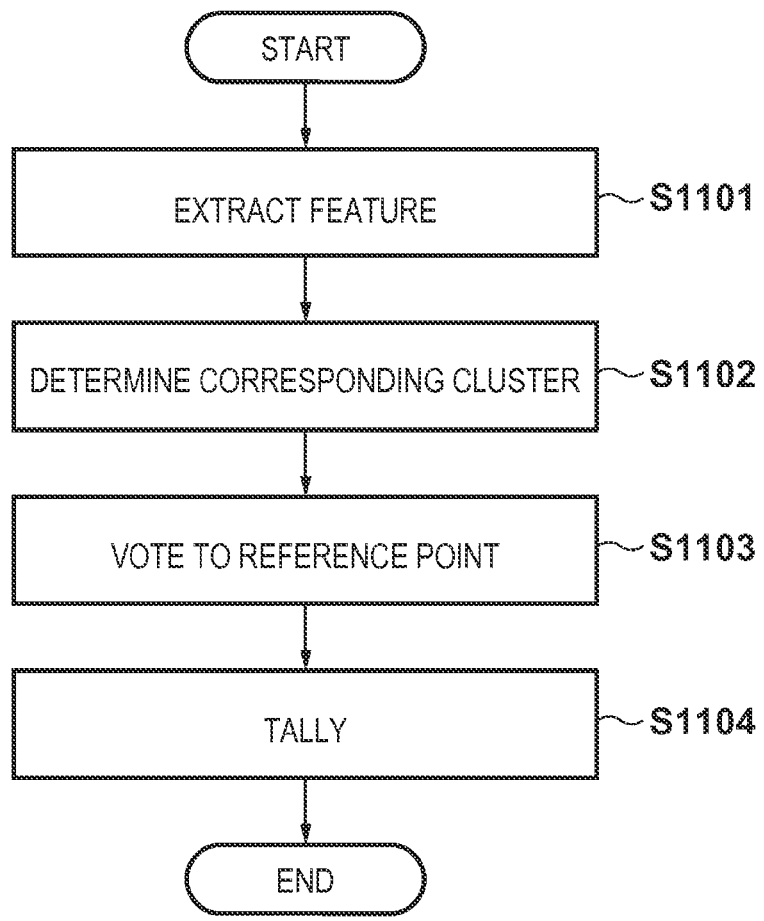
FIG. 11 is a flowchart of identification processing.

In the identification processing, using the learned identifier, a position and a class corresponding to an orientation of a target object are output. The practical processing will be described below with reference to FIG. 11 which shows the flowchart of that processing.

In step S1101, feature extraction from images is executed as in the learning processing. In step S1102, distances between feature amounts of extracted feature points and representative vectors of respective clusters are calculated to determine a cluster having the highest similarity. When the random forest method is used, feature points extracted from images are classified to determine a leaf node. The same applies to a case in which other classification trees and identifiers are used.

Figure 12:
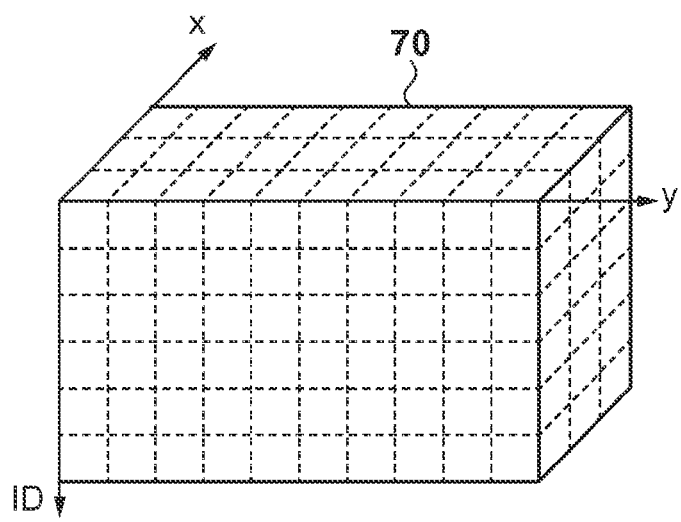
FIG. 12 is a view showing an example of a voting space.

Next, in step S1103, voting is made based on the class of the target object and vectors to reference points associated with respective feature points in a cluster to which the representative vector calculated by association belongs. A voting space in this embodiment is defined by three axes, that is, the x- and y-axes of the image coordinate system and an axis which represents a class ID. FIG. 12 shows an example of the voting space defined by the three axes, that is, the x- and y-axes of the image coordinate system and the axis which represents a class ID. FIG. 12 shows a voting space 70 defined by the three axes, that is, the x- and y-axes of the image coordinate system and the axis which represents a class ID. Assume that a size of each cell is set in advance.

In a practical voting method, a cluster k" having the highest similarity is determined by associating feature amounts Gm of respective feature points gm=(xm, ym) (m=1, ..., M) extracted from captured images and representative vectors Fk' (k=1, ..., K) of respective clusters, which have been learned in advance). In this case, M is the total number of feature points extracted from images, and m is its index.

For example, the cluster k" is calculated using Euclidean distances between feature amounts Gm of feature points gm and representative vectors Fk' (k=1, ..., K) of respective clusters according to:

$$k'' = \underset{k}{\operatorname{argmin}} |G_m - F'_k| \quad (1)$$

According to the determined cluster, voting processing is executed in accordance with vectors Mij (i=1, 2, ..., N, j=1, 2, ...) to reference points associated with feature points fi included in that cluster and class IDi (i=1, 2, ..., N). More specifically, letting (x, y, ID) be a vote point on the voting space, we have:

$$(x,y)=(x_m,y_m)+M_{ij}$$

$$ID=ID_i \quad (2)$$

In practice, a cell corresponding to calculated (x, y, ID) is voted. This processing is applied to all feature points in the determined cluster. In this case, the total number of votes is N×M at maximum.

Next, in step S1104, a cell having the maximum number of votes on the voting space voted in step S1103 is extracted. Alternatively, cells having the number of votes which are equal to or larger than a predetermined threshold or cells as many as the predetermined number (the number of candidates) in descending order of number of votes may be extracted. In this case, let P (P≥1) be the number of candidates, and (xP, yP, IDP) (p=1, 2, ..., P) be each candidate.

With the aforementioned method, since a position of a target object on the image coordinate system can be calculated, if calibration associated with the camera coordinate system and image coordinate system is executed in advance, a position on the camera coordinate system can be calculated from the calculated position on the image coordinate system. In this case, each candidate is converted into (XCP, YCP, ZCP, IDP) (p=1, 2, ..., P) using the calibration result.

Identification results as many as the predetermined number of candidates are calculated for all registered images. Next, identification success rates corresponding to positions and orientations on the corresponding camera coordinate system are calculated for respective images. Thus, the distribution $P_R$(XC, YC, ZC, θx, θy, θz) of identification success rates is calculated. This distribution $P_R$(XC, YC, ZC, θx, θy, θz) is that of identification success rates of target objects which take orientations (θx, θy, θz) at arbitrary positions (XC, YC, ZC) on the camera coordinate system. In practice, identification success rates at positions of (θx, θy, θz) corresponding to respective orientation IDs are calculated.

The identification success rates are calculated from identification results for respective images and a correct solution which is stored in advance. In the above identification method, the number of votes can be used as an identification score. For this reason, an identification success rate is calculated from an identification score $SCORE_1$ of an identification candidate P=1 obtained when identification is executed for a corresponding registered image and an identification score $SCORE_{TRUE}$ of an identification candidate PTRUE which yields a correction solution, which is set in advance, using:

$$P_R(X_C, Y_C, Z_C, \theta x, \theta y, \theta z) = \frac{SCORE_{TRUE}}{SCORE_1} \quad (3)$$

When an identification result of the candidate P=1 with respect to the registered image is TRUE, an identification success rate $P_R$ assumes a maximum value "1". When all candidates do not include identification results=TRUE, $SCORE_{TRUE}$ assumes "0", and the identification success rate $P_R$ also assumes "0". Also, a method of setting an identification score as an identification success rate when the identification result of the candidate P=1 is TRUE, and a method of setting an identification success rate to be "1" when the identification result of the candidate P=1 is TRUE, and "0" when it is FALSE can be used. The identification success rates are calculated for all the registered images, and $P_R$(XC, YC, ZC, θcx, θcy, θcz) is used in the next process.

In step S130, the image capturing unit control unit 230 calculates an inner product of the success rate distribution and probability distribution for a predetermined relative target object state with respect to each of a plurality of positions and orientations that the image capturing unit 100 can take. Then, the image capturing unit control unit 230 determines a position and orientation corresponding to the maximum inner product value.

Letting R be a rotation matrix including orientation components of the image capturing unit 100 on the world coordinate system, and T be a translation matrix including position components of the image capturing unit 100 on the world coordinate system, equation (4) below is calculated for a plurality of different matrices T and R:

$$(\hat{R}, \hat{T}) = \underset{R,T}{\operatorname{argmax}} \quad (4)$$

$$(P_P(X, Y, Z, \theta_X, \theta_Y, \theta_Z) \cdot f(P_R(X_C, Y_C, Z_C, \theta_{CX}, \theta_{CY}, \theta_{CZ}), R, T))$$

where f($P_R$(XC, YC, ZC, θcx, θcy, θcz), R, T) is a function which converts the success rate distribution defined on the camera coordinate system into that on the world coordinate system using the matrices R and T.

Note that we have φ={R, T} and X={X, Y, Z, θx, θy, θz}. f($P_R$(XC, YC, ZC, θcx, θcy, θcz), R, T) can be rewritten as $P_R$(X, Y, Z, θx, θy, θz|R, T). Therefore, equation (4) can be rewritten as:

$$(\hat{\phi}) = \underset{\phi}{\operatorname{argmax}}(P_P(X) \cdot P_R(X \mid \varphi)) \quad (5)$$

When L(φ)=$P_P$(x)·$P_R$(X|φ) in equation (5), log L(φ) need only be maximized. This can be solved by repeating an update expression given by:

$$\hat{\phi} \leftarrow \hat{\phi} + \varepsilon \frac{\partial \log L}{\partial \phi}\bigg|_{\phi=\hat{\phi}} \quad (6)$$

where ε is a small, positive scaler value. With this processing, R and T need only be calculated to increase the inner product of the success rate distribution and probability distribution on the world coordinate system. In this inner product processing, as given by the above expression, a sum total result of products of values (success rates and probability values) each for the same target object state of the converted success rate distribution and probability distribution for all target object states (in practice, an overlapping portion of the respective distributions) is calculated.

Note that the position and orientation of the image capturing unit 100 corresponding to the maximum inner product of the occurrence probability distribution and the identification success rate distribution are calculated in this embodiment. Alternatively, the update expression given by expression (6) may be updated at least once to determine the position and orientation of the image capturing unit 100. Also, initial values of the position and orientation of the image capturing unit 100 may be given randomly or by the user.

In step S140, the target object state identification unit 240 updates the position and orientation of the image capturing unit 100 to those determined in step S130, and then acquires a captured image captured by this image capturing unit 100. The target object state identification unit 240 then identifies (estimates) target object states of target objects which appear in the acquired captured image. In this identification, the identifier used in step S120 above may be used again, and another identifier may be separately prepared.

As described above, according to this embodiment, since the position and orientation of the image capturing device are determined based on probabilities of occurrence and identification success rates for respective target object states, the identification accuracies of target objects from the captured image by this image capturing device can be improved.

Second Embodiment

An example of the functional arrangement of an information processing apparatus according to this embodiment will be described below with reference to the block diagram shown in FIG. 13. In the arrangement shown in FIG. 13, the same reference numerals denote the same components as those shown in FIG. 1, and a description thereof will not be repeated. In the arrangement shown in FIG. 13, an image capturing unit changing unit 250 is added to the arrangement shown in FIG. 1.

Figure 14:
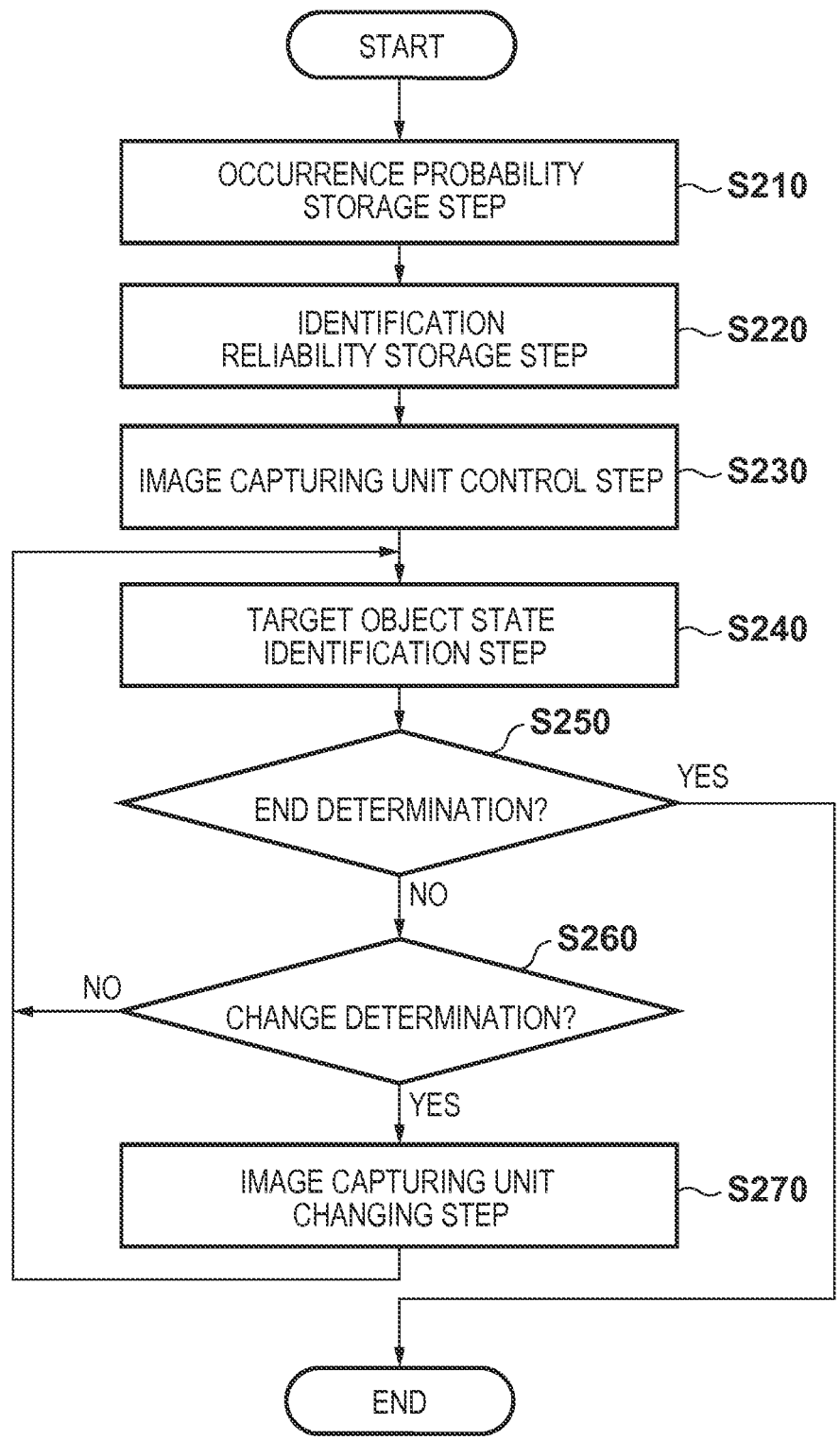
FIG. 14 is a flowchart of processing to be executed by the information processing apparatus 200.

Processing to be executed by the information processing apparatus according to this embodiment will be described below with reference to FIG. 14 which shows the flowchart of that processing. In the flowchart shown in FIG. 14, steps S250 to S270 are added to the flowchart shown in FIG. 2.

The target object state identification unit 240 checks in step S250 whether or not target object state identification processing is to be continued. If it is determined that the identification processing is to be continued, the process advances to step S260. The image capturing unit control unit 230 checks in step S260 whether or not the position and orientation of the image capturing unit 100 are required to be changed. As a result of this checking process, if the position and orientation are required to be changed, the process advances to step S270. If the position and orientation need not be changed, the process returns to step S240. In step S270, the image capturing unit control unit 230 changes the position and orientation of the image capturing unit 100.

This embodiment assumes a situation in which states of piled target objects are changed. For example, this embodiment assumes a situation in which the robot 20 or the like picks up target objects in turn.

In step S210, the image capturing unit control unit 230 executes processing for storing variables indicating the number of target objects and a height of piled target objects in an appropriate memory in the information processing apparatus in addition to the processing in step S110. Thus, a distribution which changes according to the number and height of target objects can be stored. More specifically, occurrence probability distributions for the respective numbers and heights of target objects are learned to change an occurrence probability distribution to be loaded at the time of identification. When the number and height of target objects are decreased at the time of identification, a distribution to be loaded is changed, and the position and orientation of the image capturing unit 100 are changed to improve the identification accuracy based on that distribution.

In steps S220 to S240, the same processes as those in steps S120 to S140 above are executed. Note that in step S240, in addition to the aforementioned processing, information indicating a target object whose target object state is identified is stored in an appropriate memory in the information processing apparatus, or this target object is picked up by the robot 20 or the like to be excluded from identification targets of the subsequent identification processing.

The target object state identification unit 240 checks in step S250 whether or not the identification processing is to be continued. Criteria as to whether or not the identification processing is to be continued are not limited to a specific criterion. For example, it may be determined that the identification processing is not to be continued if the current number of target objects becomes equal to or smaller than a prescribed value. The current number of target objects can be obtained by recognizing target objects which appear in a captured image by the image capturing unit 100 and counting the number of recognized target objects.

The image capturing unit changing unit 250 checks in step S260 whether or not the position and orientation of the image capturing unit 100 are to be changed. Initially, in the aforementioned occurrence probability distribution, the probability of occurrence of the position and orientation corresponding to a target object whose target object state is identified in step S240 is deleted (set to be "0"), or the occurrence probability distribution corresponding to the number and height of target objects is updated. The number of target objects is input at the time of design. The height of the target object is measured by a distance measurement sensor such as a TOF. Next, the inner product of the updated occurrence probability distribution and the identification success rate distribution is calculated in the same manner as in the first embodiment, and when the inner product result is smaller than a certain predetermined value, it is determined that the position and orientation of the image capturing unit 100 are to be changed. Alternatively, when the number of target objects is smaller than a certain predetermined value, it is determined that the position and orientation of the image capturing unit 100 are to be changed.

If it is determined that the position and orientation of the image capturing unit 100 are to be changed, the process advances to step S270; otherwise, the process returns to step S240.

In step S270, the image capturing unit control unit 230 changes the position and orientation of the image capturing unit 100 using the above equation (6). Alternatively, the position and orientation of a moving destination of the image capturing unit 100 may be simulated in advance based on the occurrence probability distribution corresponding to the number of target objects.

As described above, according to this embodiment, in addition to the effects of the first embodiment, the identification accuracies of target objects from the captured image by the image capturing unit 100 can be improved by changing at least the position or orientation of the image capturing unit 100 during identification.

Third Embodiment

In this embodiment, target object states of target objects shown in FIGS. 15 and 16 are identified. In this case, the information processing apparatus 200 also stores deformation degrees of target objects in addition to the first and second embodiments. Note that the information processing apparatus described in the first and second embodiment is applicable to this embodiment.

A target object (joint object) shown in FIG. 15 is formed of a reference object 300 and another object 301. In FIG. 15, the object 301 is tilted through an appropriate angle 302 with respect to the reference object 300. In this case, the deformation degree corresponds to this angle 302. The position and orientation of the joint object shown in FIG. 15 are those of the reference object 300. Therefore, identification of a target object state of the joint object shown in FIG. 15 is that of the position and orientation and deformation degree of the reference object 300.

A target object (deformed object) 303 shown in FIG. 16 is deformed by a curvature 304 with respect to an axis 305. Therefore, identification of a target object state of the deformed object 303 shown in FIG. 16 is that of the position of the deformed object 303, a direction of the axis 305, and the curvature 304.

Figure 2:
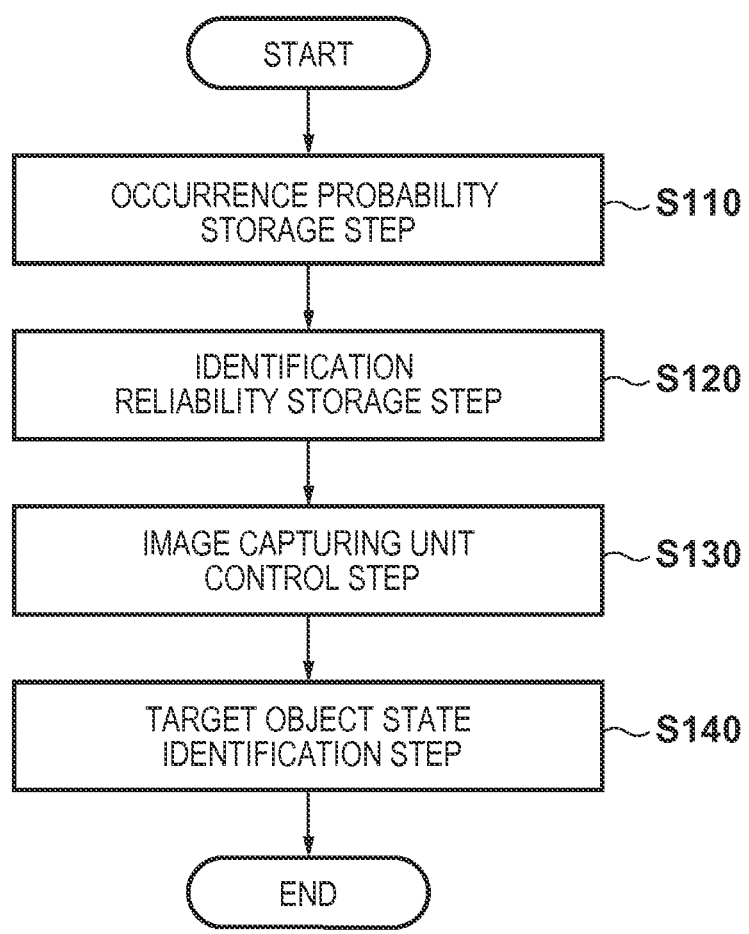
FIG. 2 is a flowchart of processing to be executed by an information processing apparatus 200.

In case of this embodiment, the processing according to the flowchart shown in FIG. 2 is basically executed. However, in step S110, in addition to the first embodiment, the angle 302 in case of the joint object shown in FIG. 15 and the direction of the axis 305 and the curvature 304 in case of the deformed object shown in FIG. 16 are stored as variables in addition to the position/orientation on the world coordinate system. Also, as in the second embodiment, the number of target objects may be stored.

As for the subsequent processes, the same processes as in the first and second embodiments are executed. In this embodiment, in addition to these processes, a joint object and deformed object are identified. Hence, only an identification method of these objects is different.

In case of the joint object shown in FIG. 15, the position and orientation of the reference object 300 are estimated. The estimation method can be the same as the identification method of target objects in the first embodiment. After the position and orientation of the reference object 300 are estimated, a possible existence area of the object 301 with respect to that reference object 300 is calculated. Next, the position and orientation of the object 301 are identified from the possible existence area of the object 301. The identification method is the same as that of target objects in the first embodiment. In this manner, the angle 302 between the reference object 300 and object 301 can be calculated.

In case of the deformed object shown in FIG. 16, the direction of the axis 305 and the curvature 304 with respect to that axis 305 can be estimated by identifying a position of an end position of the deformed object 303 from an image, and searching for edges and the like from the end portion toward the other end portion of the deformed object 303.

As described above, according to this embodiment, since the position and orientation of the image capturing unit 100 are determined based on the probabilities of occurrence and identification success rates for respective states including deformation degrees and curvatures of target objects, the identification accuracies of target objects from a captured image by this image capturing device can be improved. Also, since existence positions or areas of target objects are determined based on the probabilities of occurrence and identification success rates, the identification accuracies of target objects from a captured image by this image capturing device can be improved.

Fourth Embodiment

Figure 13:
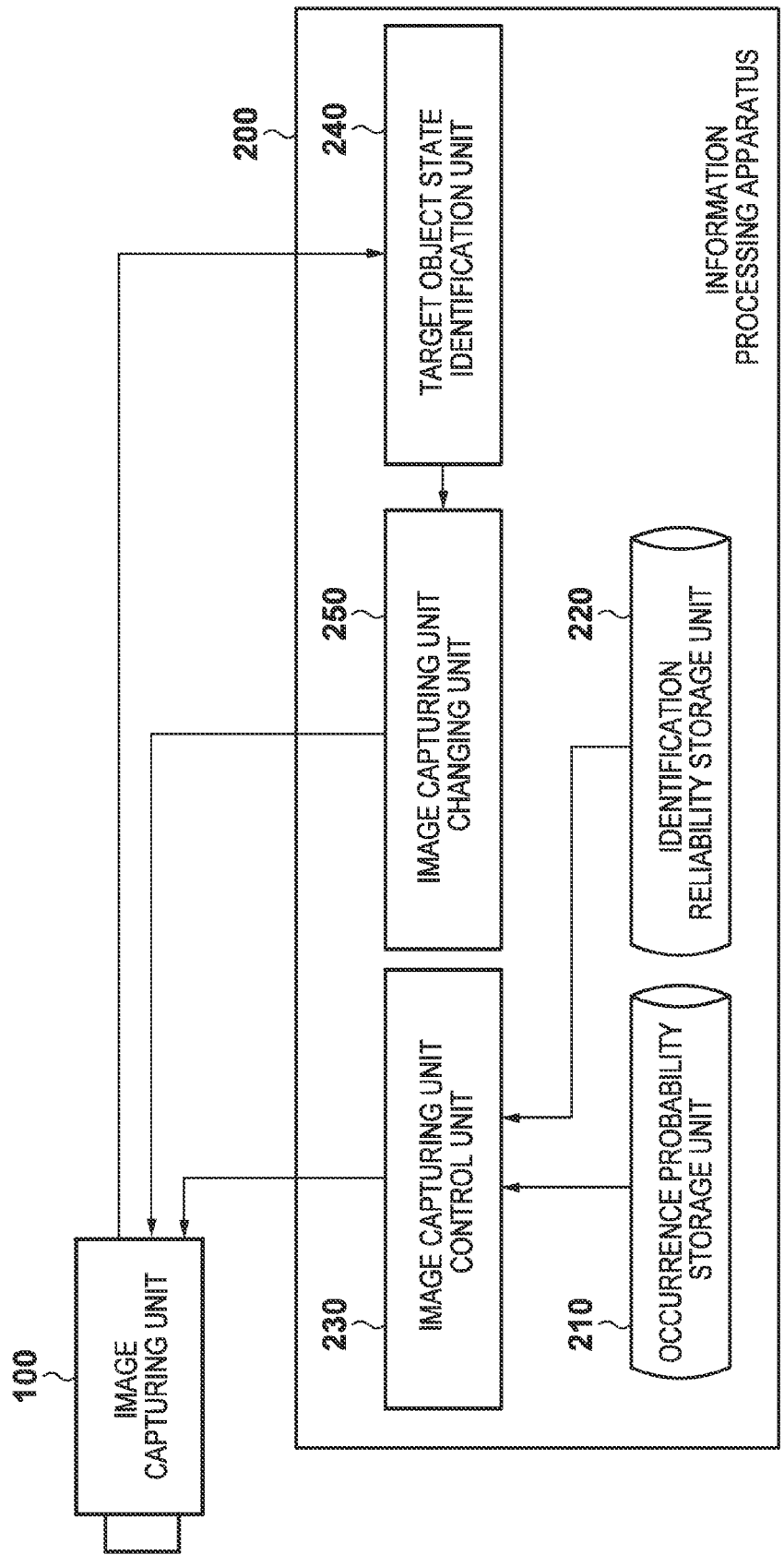
FIG. 13 is a block diagram showing an example of the functional arrangement of an information processing apparatus and its peripheral device.

The respective units included in the information processing apparatus 200 shown in FIGS. 1 and 13 may be implemented by hardware. Alternatively, the occurrence probability storage unit 210 and identification reliability storage unit 220 may be implemented by a memory such as a RAM or hard disk, and the remaining unit may be implemented by computer programs. In this case, these computer programs are stored in this memory, and are executed by a processor such as a CPU.

Therefore, a computer having at least this memory and processor is applicable to the information processing apparatus 200. The aforementioned image capturing unit 100 may be connected to this computer and may input captured images to this computer, or captured images may be stored in advance in the hard disk.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264125 filed Dec. 1, 2011, which is hereby incorporated by reference herein in its entirety.

What is claimed is:

1. An information processing apparatus, comprising:
 a first acquisition unit configured to acquire a probability at which a target object takes a target object state for each of target object states that the target object is allowed to take, and configured to acquire a distribution of the acquired probabilities;
 a second acquisition unit configured to acquire a success rate, for each relative target object state being determined in advance for a position and an orientation of an image capturing device, at which the target object is successfully identified from a captured image obtained by capturing, by the image capturing device, the target object having the relative target object state, and configured to acquire a distribution of the acquired success rates; and
 a determination unit configured to determine a position and orientation that the image capturing device is to take based on the distribution of the success rates acquired by said second acquisition unit for each of a plurality of positions and orientations that the image capturing apparatus is allowed to take, and the distribution of the probabilities acquired by said first acquisition unit.

2. The apparatus according to claim 1, further comprising:
a changing unit configured to change a position and an orientation of the image capturing device to the position and the orientation determined by said determination unit; and
a unit configured to identify the target object state of the target object which appears in an image captured by the image capturing device, the position and orientation of which are changed by said changing unit.

3. The apparatus according to claim 1, further comprising:
a unit configured to update a probability value corresponding to the target object state to be 0 in the distribution of the probabilities after the target object state of the target object is identified.

4. The apparatus according to claim 1, wherein said first acquisition unit acquires the distribution of the probabilities, which is generated in advance, and
said second acquisition unit acquires the distribution of the success rates, which is generated in advance.

5. The apparatus according to claim 1, wherein said determination unit calculates an inner product of the distribution of the success rates acquired by said second acquisition unit and the distribution of the probabilities acquired by said first acquisition unit for each of the plurality of positions and orientations that the image capturing device is allowed to take, and determines a position and an orientation corresponding to a maximum value of the calculated inner products as a position and an orientation that the image capturing device is to take.

6. The apparatus according to claim 1, wherein the target object state is defined by a position and/or an orientation of the target object.

7. A non-transitory computer-readable storage medium storing a computer program for controlling a computer to function as respective units of an information processing apparatus of claim 1.

8. An information processing method, comprising:
a first acquisition step of acquiring a probability at which a target object takes a target object state for each of target object states that the target object is allowed to take, and of acquiring a distribution of the acquired probabilities;
a second acquisition step of acquiring a success rate, for each relative target object state being determined in advance for a position and an orientation of an image capturing device, at which the target object is successfully identified from a captured image obtained by capturing, by the image capturing device, the target object having the relative target object state, and of acquiring a distribution of the acquired success rates; and
a determination step of determining a position and orientation that the image capturing device is to take based on the distribution of the success rates acquired in the second acquisition step for each of a plurality of positions and orientations that the image capturing apparatus is allowed to take, and the distribution of the probabilities acquired in the first acquisition step.

* * * * *